(12) United States Patent
Bruhn et al.

(10) Patent No.: US 6,458,583 B1
(45) Date of Patent: *Oct. 1, 2002

(54) METHOD AND APPARATUS FOR MAKING NUCLEIC ACID ARRAYS

(75) Inventors: Laurakay Bruhn; Michael P. Caren, both of Palo Alto; Carol T. Schembri, San Mateo; Arthur Schleifer, Portola Valley, all of CA (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/150,504

(22) Filed: Sep. 9, 1998

(51) Int. Cl.⁷ ................................................ C12M 1/34
(52) U.S. Cl. .......................... 435/287.2; 435/6; 436/94; 536/23.1; 536/25.3; 422/100
(58) Field of Search ........................ 435/6, 91.1, 287.2; 436/94, 518; 536/23.1, 25.3; 422/100

(56) References Cited

U.S. PATENT DOCUMENTS

| | | | | |
|---|---|---|---|---|
| 4,877,745 A | | 10/1989 | Hayes et al. ................. | 436/166 |
| 5,338,688 A | | 8/1994 | Deeg et al. .................. | 436/180 |
| 5,449,754 A | | 9/1995 | Nishioka et al. ............. | 530/334 |
| 5,474,796 A | | 12/1995 | Brennan .................... | 427/2.13 |
| 5,599,695 A | * | 2/1997 | Pease et al. ................ | 435/91.1 |
| 5,658,802 A | | 8/1997 | Hayes et al. ................ | 436/518 |
| 5,700,637 A | | 12/1997 | Southern et al. ............... | 435/6 |
| 5,831,070 A | * | 11/1998 | Pease et al. ................. | 536/25.3 |
| 5,958,342 A | * | 9/1999 | Gamble et al. ............. | 422/100 |
| 6,079,283 A | | 6/2000 | Papen et al. | |
| 6,083,762 A | | 7/2000 | Papen et al. | |
| 2001/0018512 A1 | * | 8/2001 | Blanchard .................. | 536/23.5 |

* cited by examiner

Primary Examiner—Bradley L. Sisson

(57) ABSTRACT

Methods and devices for depositing a nucleic acid on a substrate surface are provided. In the subject methods, a thermal inkjet head loaded with nucleic acid fluid composition is positioned in opposing relationship to, e.g. over, a substrate surface. Actuation of the thermal inkjet results in the expulsion of volume of the nucleic acid composition onto the substrate surface. The subject methods and devices find use in a variety of applications, particularly in the preparation of nucleic acid arrays, and more particular arrays of oligonucleotides or polynucleotides, e.g. cDNAs.

10 Claims, 2 Drawing Sheets

METHOD AND APPARATUS FOR MAKING NUCLEIC ACID ARRAYS

TECHNICAL FIELD

The field of this invention is nucleic acid arrays.

BACKGROUND OF THE INVENTION

"Biochips" or arrays of binding agents, such as oligonucleotides and peptides, have become an increasingly important tool in the biotechnology industry and related fields. These binding agent arrays, in which a plurality of binding agents are deposited onto a solid support surface in the form of an array or pattern, find use in a variety of applications, including gene expression analysis, drug screening, nucleic acid sequencing, mutation analysis, and the like.

Such arrays may be prepared in a number of different ways. For example, DNA arrays may be prepared manually by spotting DNA onto the surface of a substrate with a micro pipette. See Khrapko et al., DNA Sequence (1991) 1:375–388. Alternatively, the dot-blot approach, as well as the derivative slot-blot approach, may be employed in which a vacuum manifold transfers aqueous DNA samples from a plurality of wells to a substrate surface. In yet another method of producing arrays of biopolymeric molecules, a pin is dipped into a fluid sample of the biopolymeric compound and then contacted with the substrate surface. By using a plurality or array of pins, one can transfer a plurality of samples to the substrate surface at the same time. Alternatively, an array of capillaries can be used to produce biopolymeric arrays. See WO 95/35505. In another method of producing biopolymeric arrays, arrays of biopolymeric agents are "grown" on the surface of a substrate in discreet regions. See e.g. U.S. Pat. No. 5,143,854 and Fodor et al., Science (1991) 251:767–773. In yet another method of producing nucleic acid arrays, piezo inkjets are used to deposit nucleic acids on the surface of a substrate. See U.S. Pat. No. 5,658,802. However, the U.S. Pat. No. 5,658,802 patent states that with regard to thermal inkjet devices, "[t]hermal ink jets, however, are very stressful on the dispensed fluid and the fluid must not be too aggressive to the heater element. Because of these constraints, thermal ink jets are generally unsuitable for dispensing applications other than those where the composition of the ink can be fully controlled." Col. 2, lines 14 to 19. Each of the above methods of producing arrays has certain disadvantages, e.g. complexity, non-reproducibility, etc.

Accordingly, there is continued interest in the development of new methods and devices for producing biopolymeric arrays. Of particular interest would be the development of a method for rapidly producing a nucleic acid array in which a minimal amount of the nucleic acid sample is used to produce reproducible nucleic acid spots.

Relevant Literature

Patents and patent applications describing arrays of biopolymeric compounds and methods for their fabrication include: U.S. Pat. Nos. 5,242,974; 5,384,261; 5,405,783; 5,412,087; 5,424,186; 5,429,807; 5,436,327; 5,445,934; 5,472,672; 5,527,681; 5,529,756; 5,545,531; 5,554,501; 5,556,752; 5,561,071; 5,599,695; 5,624,711; 5,639,603; 5,658,734; WO 93/17126; WO 95/11995; WO 95/35505; EP 742 287; and EP 799 897.

Other references of interest include: Lockhart et al., Nature Biotechnology (1996) 14: 1675–1680; Schena et al., Science (1995) 270: 467–470; Schena et al., Proc. Nat'l Acad. Sci. USA (1996)93:10614–10619; Shalon et al., Genome Res. (1996) 6: 639–645; Milosavljevic et al., Genome Res. (1996) 6:132–141; Nguyen et al., Genomics (1995)29: 207–216; Piétu et al., Genome Res. (1996) 6: 492–503; Zhao et al., Gene (1995) 166:207–213; Chalifour et al., Anal. Biochem. (1994) 216:299–304; Heller et al., Proc. Nat'l Acad. Sci. USA (1997) 94: 2150–2155; Khrapko et al., DNA Sequence (1991) 1:375–388; Lehrach et al., Hybridization Fingerprinting in Genome Mapping and Sequencing, Genome Analysis, Vol. 1 (Davies & Tilgham, eds)(Cold Spring Harbor Press) (1990) pp 39–81; Schema, M., BioAssays (1996) 18: 427–431; DeRisi et al., Nat. Genet. (1996) 14457–460; DeRisi et al., Science (1997) 278: 680–686; and Chen et al., Biomedical Optics (1997) 2: 364–374.

U.S. Patents disclosing the use of inkjet devices to dispense bio/chemical agents such as proteins and nucleic acids include: U.S. Pat. Nos. 4,877,745; 5,338,688; 5,474,796; 5,449,754; 5,658,802; and 5,700,637.

SUMMARY OF THE INVENTION

Methods and devices for depositing nucleic acids on a substrate surface are provided. In the subject methods, a thermal inkjet head loaded with fluid composition of the nucleic acid is positioned in opposing relationship to, e.g. over, a substrate surface. The thermal inkjet head is then actuated in a manner sufficient to expel a volume of the aqueous nucleic acid composition onto the substrate surface. The subject methods and devices find use in a variety of applications, particularly in the preparation of nucleic acid arrays, including arrays of oligonucleotides and polynucleotides, e.g. cDNA arrays.

DEFINITIONS

Figure 1A:
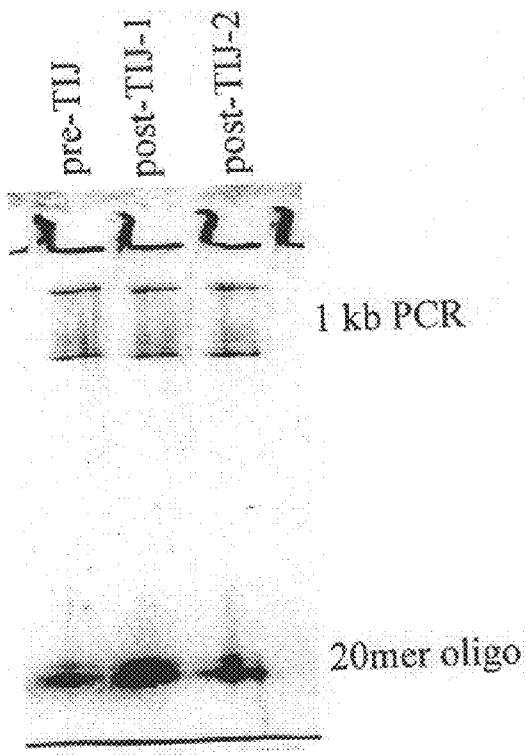
FIGS. 1A and 1B provide representations of polyacrylamide gels of nucleic acids before and after firing from a thermal inkjet head.

The term "nucleic acid" as used herein means a polymer composed of nucleotides, e.g. deoxyribonucleotides or ribonucleotides.

The terms "ribonucleic acid" and "RNA" as used herein means a polymer composed of ribonucleotides.

The terms "deoxyribonucleic acid" and "DNA" as used herein means a polymer composed of deoxyribonucleotides.

The term "oligonucleotide" as used herein denotes single stranded nucleotide multimers of from about 10 to up to about 100 nucleotides in length.

The term "polynucleotide" as used herein refers to single or double stranded polymer composed of nucleotide monomers of generally greater than 100 nucleotides in length and up to about 8,000 or more nucleotides in length.

The term "cDNA" as used herein means a complementary DNA molecule made as a copy of mRNA amplified using PCR for deposition on arrays. cDNAs can range from about 100 bp to about 8,000 bp, where average cDNAs are typically 1 to 2 kb in length.

DESCRIPTION OF THE SPECIFIC EMBODIMENTS

Methods and devices for depositing a nucleic acid on the surface of a substrate are provided. In the subject methods, a thermal inkjet head loaded with a fluid composition of the nucleic acid is positioned in opposing relationship to, e.g. over, a substrate surface. The temperature of the heating element of the inkjet head is then raised such that a bubble is formed at the surface of the heating element and a volume of the nucleic acid fluid composition is expelled from the head onto the substrate surface. The subject methods and devices are particularly suited for use in the production of nucleic acid arrays, including oligonucleotide and polynucleotide arrays, e.g. cDNA arrays.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The subject invention is a method of depositing a nucleic acid on the surface of a substrate, as well as devices for practicing the method and the arrays produced thereby. Critical to the subject method is the use of a thermal inkjet head to deposit the nucleic acid on the substrate surface.

Thermal inkjet heads are well known in the art of conventional printing and document production. As is known to those of skill in the art, thermal inkjet heads typically have at least the following components: (a) an orifice; (b) a firing chamber; and (c) a heating element. Thermal inkjet heads and methods for their manufacture and use are described in a number of different U.S. Patents, including: U.S. Pat. Nos. 5,772,829; 5,745,128; 5,736,998; 5,736,995; 5,726,690; 5,714,989; 5,682,188; 5,677,577; 5,642,142; 5,636,441; 5,635,968; 5,635,966; 5,595,785; 5,477,255; 5,434,606; 5,426,458; 5,350,616; 5,341,160; 5,300,958; 5,229,785; 5,187,500; 5,167,776; 5,159,353; 5,122,812; and 4,791,435; the disclosures of which are herein incorporated by reference. Thermal inkjet heads finding use in the subject methods will generally have the following characteristics. The size of the orifice is sufficient to produce a spot of suitable dimensions on the substrate surface, where the orifice generally has a diameter (or exit diagonal depending on the specific format of the ink jet head) ranging from about 1 to 1000 $\mu$m, usually from about 5 to 100 $\mu$m and more usually from about 10 to 60 $\mu$m. The firing chamber has a volume ranging from about 1 pl to 10 nl, usually from about 10 pl to 5 nl and more usually from about 50 pl to 1.5 nl. The heating element will preferably be made out of a material that can deliver a quick energy pulse, where suitable materials include: TaAl and the like. The thermal element is capable of achieving temperatures sufficient to vaporize a sufficient volume of the nucleic acid composition in the firing chamber to produce a bubble of suitable dimensions upon actuation of the head. Generally, the heating element is capable of attaining temperatures of at least about 100° C., usually at least about 400° C. and more usually at least about 700° C., where the temperature achievable by the heating element may be as high as 1000° C. or higher. The device may also have a reservoir. When present, the reservoir will typically have a volume ranging from about 1 pl to 1 l, usually from about 0.5 $\mu$l to 10 $\mu$l and more usually from about 1 $\mu$l to 5 $\mu$l. A variety of thermal inkjet heads are available commercially, where such devices include: the HP92261 A thermal inkjet head (available from Hewlett-Packard Co., Palo Alto Calif.), the HP 51645 A thermal inkjet head (available from Hewlett-Packard Co. Palo Alto Calif.), the inkjet produced by (Cannon Kabushiki Kaisha, Tokyo, Japan) and the like. Specific inkjet heads of interest are disclosed in U.S. Pat. Nos. 5,736,998 and 4,668,052, the disclosures of which are herein incorporated by reference.

In practicing the subject methods, the thermal inkjet device is loaded with a fluid nucleic acid composition or fluid. By fluid nucleic acid composition is meant a composition of nucleic acid molecules in combination with a carrier liquid, where the nucleic acid molecules will generally, though not necessarily, be dissolved in the carrier liquid such that the carrier liquid serves as a solvent. The carrier liquid may be one or more different fluids, including polar liquids, e.g. water, DMSO, formamide, and the like. In many instances, the carrier liquid will be aqueous, being either water alone or water in combination with a co-solvent. The nucleic acid fluid composition may also contain one or more additional agents, including: buffering agents, salts, metal cations, surfactants, enzymes, etc., where such agents may be present in the composition as a result of the way tin which the composition is prepared. For example, where the nucleic acid composition is prepared via preparative PCR techniques, the fluid composition that is loaded into the inkjet head may contain, in addition to water and the PCR produced product DNA, buffers, dNTPs, polymerase, salts, left over primers, and the like. The nucleic acid fluid compositions may be prepared in a number of different ways. Thus, the nucleic acid may be synthesized using phosphoramidite synthesis technology, preparative PCR, purification from naturally occurring sources, and the like, where such methods are well known to those of skill in the art.

The nucleic acid of the aqueous nucleic acid composition may vary considerably. As such, the nucleic acid may be DNA, RNA or some other synthetic type of nucleic acid in which the conventional backbone has been replaced with a non-naturally occurring or synthetic backbone, e.g. PNA and the like, and/or one or more of the conventional bases has been replaced with a synthetic base capable of participating in Watson-Crick type hydrogen bonding interactions. The length of the nucleic acid may vary and will be chosen depending on the article to be prepared using the subject method, e.g. the nature of the nucleic acid array to be produced. Thus, the nucleic acid may be an oligonucleotide or a polynucleotide. Of particular interest is the use of the subject methods to deposit oligonucleotides on the surface of a substrate, i.e. to produce oligonucleotide arrays. Also of particular interest is the use of the subject methods to deposit polynucleotides on the surface of a substrate. As indicated in the definitions section above, a polynucleotide is a polymer of nucleotides that is at least about 100 nt in length, usually at least about 120 nt in length and more usually at least about 150 nt in length, where the polynucleotide may be a long as 8,000 nt in length or longer, but in many embodiments will not exceed about 3,000 nt in length. The nucleic acid in many embodiments of particular interest is cDNA.

The nucleic acid composition or fluid may be loaded into the firing chamber and fluid reservoir using any convenient means. Thus, conventional methods of introducing ink into thermal inkjet heads may be employed. Where such methods are employed, following loading of the nucleic acid fluid into the inkjet head, it is often desirable to "prime" the device prior to use. One means of priming the device is to apply sufficient pressure to the fluid in the reservoir (or conversely negative pressure to the orifice) such that a volume of fluid is forced out of the orifice. Such priming methods are currently employed in the printing industry and thus are well known to those of skill in the art.

Alternatively, where minimal waste of the nucleic acid fluid is desired, e.g. where the fluid is an expensive or rare cDNA sample, the following method of loading the nucleic acid composition into the firing chamber and reservoir may be employed. In this method of nucleic acid composition loading, the orifice is contacted with the nucleic acid fluid composition under conditions sufficient for fluid to flow through the orifice and into the firing chamber of the head, where fluid flow is due, at least in part, to capillary forces. To assist in the flow of fluid into the orifice, back pressure in the form of suction (i.e. negative pressure) may be applied to the firing chamber (and reservoir, if present) of the head, where the back pressure will typically be at least about 5, and may be at least about 10 and even as great as about 100 inches of $H_2O$ or more.

To deposit nucleic acid onto the surface of a substrate according to the subject methods, the nucleic acid composition loaded thermal inkjet head is positioned in opposing relationship relative to the surface of the substrate, where the orifice is in opposition to the position on the substrate at which deposition of the nucleic acid is desired. The distance between the orifice and the substrate surface will not be so great that the volume of nucleic acid fluid cannot reach the substrate surface and produce a spot in a reproducible manner. As such, the distance between the orifice and the substrate surface will generally range from about 10 $\mu$m to 10 mm, usually from about 100 $\mu$m to 2 mm and more usually from about 200 $\mu$m to 1 mm.

After the head is placed into position relative to the substrate surface, the temperature of the heating element or resistor of the head is raised to a temperature sufficient to vaporize a portion of the fluid immediately adjacent to the resistor and produce a bubble. In raising the temperature of the heating element, the temperature of the heating element is raised to at least about 100° C., usually at least about 400° C. and more usually at least about 700° C., where the temperature may be raised as high as 1000 ° C. or higher, but will usually be raised to a temperature that does not exceed about 2000° C. and more usually does not exceed about 1500° C. As such, a sufficient amount of energy will be delivered to the resistor to produce the requisite temperature rise, where the amount of energy will generally range from about 1.0 to 100 $\mu$J, usually from about 1.5 to 15 $\mu$J. The portion of fluid in the firing chamber that is vaporized will be sufficient to produce a bubble in the firing chamber of sufficient volume to force an amount of liquid out of the orifice.

The formation of the bubble in the firing chamber traps a portion or volume of the fluid present in the firing chamber between the heating element and the orifice and forces an amount or volume of fluid out of the orifice at high speed. The amount or volume of fluid that is forced out of the firing chamber can be controlled depending on the specific amount of nucleic acid that is desired to be deposited on the substrate. As is known in the art, the amount of fluid that is expelled can be controlled by changing one or more of a number of different parameters of the ink jet head, including: the orifice diameter, the orifice length (depth), the size of the firing chamber, the size of the heating element, and the like. Such variations are well known to those of skill in the art. As such, the amount or volume of fluid that is forced out or expelled from the firing chamber may range from about 0.1 to 1000 pl, usually from about 0.5 to 500 pl and more usually from about 1.0 to 250 pl. The speed at which the fluid is expelled from the firing chamber is at least about 1 m/s, usually at least about 10 m/s and may be as great as about 20 m/s or greater.

Upon actuation of the thermal inkjet head, as described above, fluid is expelled from the orifice and travels to the substrate surface, where it forms a spot on the substrate surface. In this manner, the nucleic acid is deposited on the substrate surface. As mentioned above, by varying the design parameters of the thermal inkjet head, the spot dimensions can be controlled such that spots of various sizes can be produced. In addition, multiple fires or patterning can be used to form larger features. With the subjects methods, one can produce spot sizes which have diameters ranging from a minimum of about 10 $\mu$m to a maximum of about 1.0 m. In those embodiments where very small spot sizes are desired, one can produce small spots that have a diameter ranging from about 1.0 $\mu$m to 1.0 mm, usually from about 5.0 $\mu$m to 500 $\mu$m and more usually from about 10 $\mu$m to 200 $\mu$m.

An important feature of the subject invention is that the deposited nucleic acid is capable of hybridizing to complementary nucleic acids. In other words, the deposition process does not adversely affect the nucleic acid of the sample, e.g. does not physically alter the nature of the nucleic acid such that it cannot subsequently participate in Watson-Crick type hydrogen bonding interactions.

The subject methods can be used to deposit a single nucleic acid sample on a substrate surface, i.e. a single nucleic acid spot, or a plurality of nucleic acid samples or spots on the surface, e.g. a pattern of spots as found in a nucleic acid array, where by plurality is meant at least 2, usually at least 5 and more usually at least 10. Where a pattern of spots is deposited on a substrate surface, the pattern may vary as desired. As such, the pattern may be in the form of organized rows and columns of spots, e.g. a grid of spots, across the substrate surface, a series of curvilinear rows across the substrate surface, e.g. a series of concentric circles or semi-circles of spots, and the like.

The subject methods and devices may be used to deposit nucleic acid samples on a variety of different substrates, including both flexible and rigid substrates. By flexible is meant that the support is capable of being bent, folded or similarly manipulated without breakage. Examples of solid materials which are flexible solid supports with respect to the present invention include membranes, flexible plastic films, and the like. By rigid is meant that the support is solid and does not readily bend, i.e. the support is not flexible. As such, rigid substrates are sufficient to provide physical support and structure to the nucleic acid spots present thereon. Furthermore, when the rigid supports of the subject invention are bent, they are prone to breakage.

The substrates may take a variety of configurations ranging from simple to complex. Thus, the substrate could have an overall slide or plate configuration, such as a rectangular, square or disc configuration. In many embodiments, the substrate will have a rectangular cross-sectional shape, having a length of from about 4 mm to 200 mm, usually from about 4 to 150 mm and more usually from about 4 to 125 mm and a width of from about 4 mm to 200 mm, usually from about 4 mm to 120 mm and more usually from about 4 mm to 80 mm, and a thickness of from about 0.01 mm to 5.0 mm, usually from about 0.1 mm to 2 mm and more usually from about 0.2 to 1 mm.

The substrates may be fabricated from a variety of materials. In certain embodiments, e.g. where one is interested in the production of nucleic acid arrays for use in research and related applications, the materials from which the substrate may be fabricated should ideally exhibit a low level of non-specific binding during hybridization events. In many situations, it will also be preferable to employ a material that is transparent to visible and/or UV light. For flexible substrates, materials of interest include: nylon, both modified and unmodified, nitrocellulose, polypropylene, polyester films, such as polyethylene terephthalate, and the like, where a nylon membrane, as well as derivatives thereof, is of particular interest in this embodiment. For rigid substrates, specific materials of interest include: silicon; glass; plastics, e.g. polytetrafluoroethylene, polypropylene, polystyrene, polycarbonate, and blends thereof, and the like; metals, e.g. gold, platinum, and the like; etc.

The substrate surface onto which the nucleic acid composition is deposited may be smooth or substantially planar, or have irregularities, such as depressions or elevations, or have a porous surface, such as is found in porous glass or silica. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, conformal silica or glass coatings, polymers, small organic molecules and the like. Polymeric layers of interest include layers of: peptides, proteins, polynucleic acids or mimetics thereof, e.g. peptide nucleic acids and the like; polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto, e.g. conjugated.

The methods find use in a variety of different applications in which it is desired to place or deposit a volume of a nucleic acid sample onto the surface of a substrate, where the nucleic acid is capable of participating in a hybridization event, e.g. is capable of bonding in a Watson-Crick base pair type fashion. Examples of applications in which the subject invention fmds use include: the preparation of diagnostic devices, e.g. test strips for nucleic acid analytes; the preparation of nucleic acid arrays; and the like, where the subject invention is particularly suited for use in the production of nucleic acid arrays, more particularly arrays of polynucleotides, e.g. cDNA arrays.

The subject invention may be used to produce nucleic acid arrays in which each spot on the array surface is small. As defined above, by small is meant that each spot on the array has a diameter that is at least about 1 µm, usually at least about 5 µm and more usually at least about 10 µm and does not exceed about 1 mm, usually does not exceed about 500 µm and more usually does not exceed about 200 µm. Because of the nature of the process, the nucleic acid on the surface of the array is capable of hydrogen bonding with complementary nucleic acids. Of particular interest in certain embodiments are arrays produced by the subject invention in which the nucleic acid is an oligonucleotide. Also of particular interest in many embodiments are arrays produced by the subject invention in which the nucleic acid is a polynucleotide, e.g. a cDNA.

Also provided by the subject invention are automated devices for depositing nucleic acids on a substrate surface, e.g. for producing nucleic acid arrays. The automated devices of the subject invention are analogous to conventional thermal inkjet printing devices, with the exception that the thermal inkjet head of the device is filled with a nucleic acid fluid instead of ink. Such automatic devices comprise at least a means for precisely controlling the position of the head with respect to a substrate and for firing the head. Such automated devices are well known to those of skill in the printing and document production art, and are disclosed in U.S. Pat. Nos. 5,772,829; 5,745,128; 5,736,998; 5,736,995; 5,726,690; 5,714,989; 5,682,188; 5,677,577; 5,642,142; 5,636,441; 5,635,968; 5,635,966; 5,595,785; 5,477,255; 5,434,606; 5,426,458; 5,350,616; 5,341,160; 5,300,958; 5,229,785; 5,187,500; 5,167,776; 5,159,353; 5,122,812; and 4,791,435; the disclosures of which are herein incorporated by reference.

Also provided by the subject invention are kits for use in depositing a nucleic acid on a substrate according to the subject methods. The subject kits include at least a thermal inkjet head and instructions for practicing the subject invention, where the instructions may be present as a package insert or on the packaging of the device. The subject kits may further include various reagents for preparing the nucleic acid fluid composition that is to be deposited on a substrate, e.g. reagents for practicing preparative PCR, such as polymerase, dNTPs, buffer medium and the like. In certain embodiments, the thermal inkjet head of the kit may be pre-filled with a nucleic acid fluid. In some embodiments, the kits may also comprise the substrate onto which the nucleic acid is to be deposited.

The following is offered by way of illustration and not by way of limitation.

EXPERIMENTAL

I. Effects of Thermal Inkjet Firing on DNA

A. Cy3 fluorescent dye end-labeled 1 kb and 0.1 kb double-stranded DNAs containing vector and hepatitis C virus sequences were generated by PCR using Cy3 end-labeled primers and a plasmid template containing hepatitis C virus sequences in the vector pSP64 (Promega, Madison, Wis.). Taq Gold enzyme (Perkin Elmer, Foster City, Calif.) was used for the PCR according to manufacturers instructions. The DNAs from the PCR reactions were concentrated using ethanol precipitation and re-suspended in 0.5 M sodium carbonate, pH9 at a concentration of 0.5 mg/ml. An HP 92261 A thermal ink jet head was used to fire 2500 droplets of 200 pl (total 0.5 µl) of each DNA onto parafilm. The material (0.5 µl) was collected and analyzed on a denaturing polyacrylamide gel to check for degradation. DNAs separated on the gels were visualized both with Stains-All (Sigma, St. Louis, Mo.) staining and fluorescence detection of the Cy3 label. The fluorescence scans were quantitated using ImageQuant software (from Molecular Dynamics, Sunnyvale, Calif.). The Cy3 scan of the 1 kb PCR product and associated primers is shown in FIG. 1A. Qualitatively, the DNA samples that were put into the inkjet looked the same as what came out, both for the first 0.5 µl (post-Jet-1) and the second 0.5 µl (post-Jet-2) samples. There were ~20 mer oligos in the DNA samples (left-over PCR primers) that also look the same before and after inkjetting. The results demonstrate that most, if not substantially all, of the DNA seems intact in terms of breaks along the backbone of the DNA.

Figure 1B:
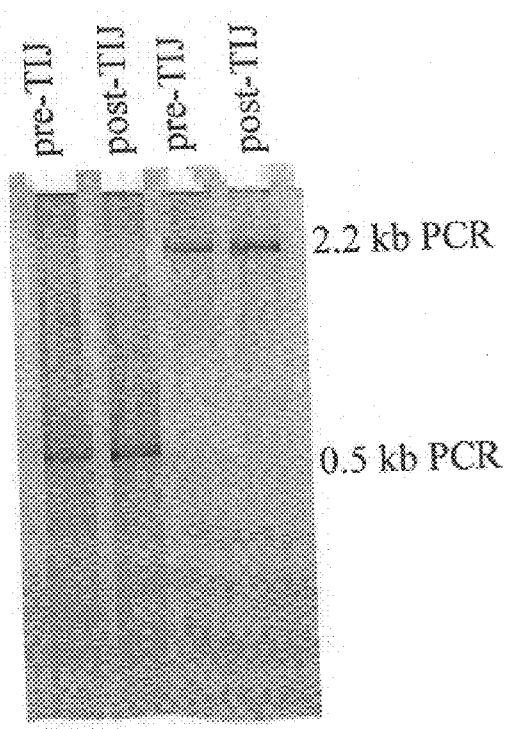

B. Gel electrophoresis experiments similar to those shown in 1. A above were performed to examine DNAs fired from an HP 51645 A thermal inkjet head (which has a smaller volume, higher velocity and greater fluidic sheer forces than the HP92261 A inkjet head). Native gel electrophoresis was employed to examine both 500 bp and 2200 bp DNAs. It was found that neither showed detectable degradation after firing from the inkjet. The results are depicted in FIG. 1B.

Figure 2A:
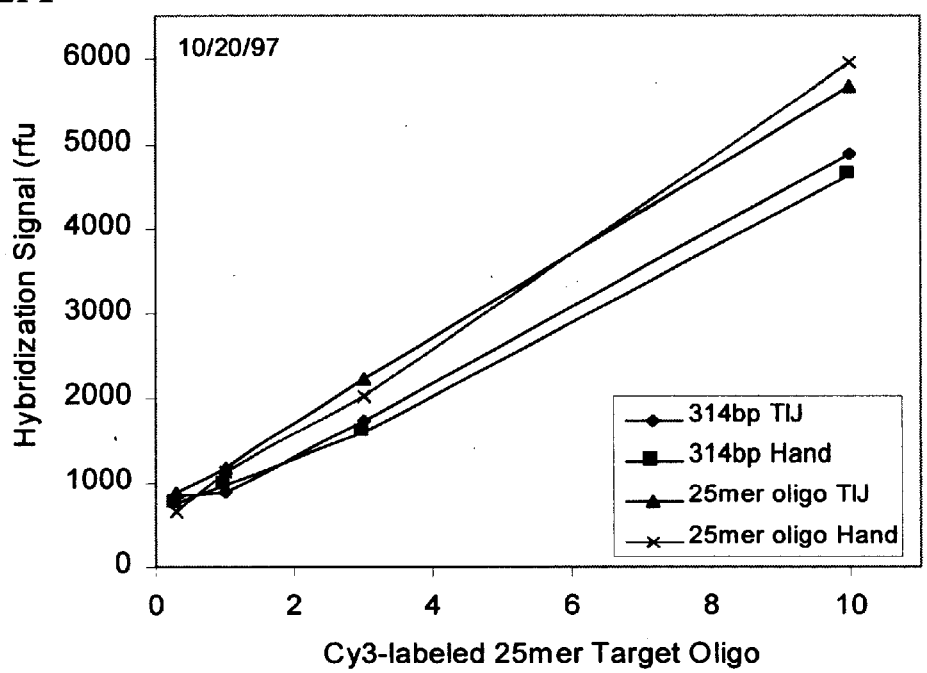
FIGS. 2A and 2B provide a graphical representation of the hybridization characteristics of both inkjet fired and hand pipetted nucleic acids.
Figure 2B:
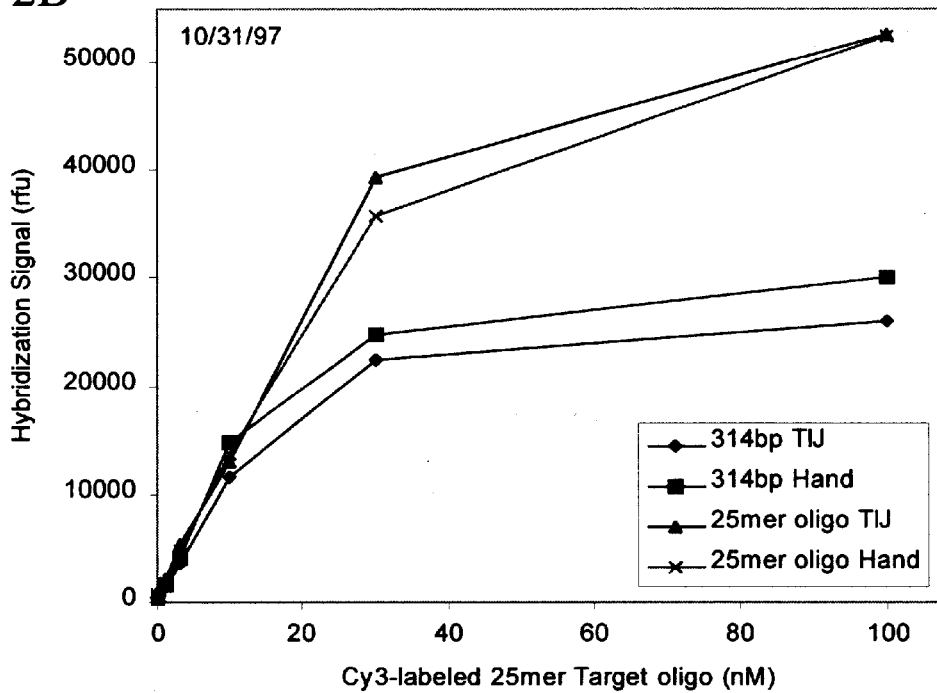

II. DNA samples were thermal inkjetted onto a glass substrate derivatized with aminopropyltrimethoxysilane-phenyldiisothiocyanate [Guo et al (1994) Nucl. Acids Res. 22:5456–65]. The DNA samples included a 314 bp hepatitis C virus sequence-containing PCR product prepared as described above and a 25 nt synthetic oligonucleotide prepared on an ABI synthesizer using standard phosphoramidite chemistry [Beaucage et al. (1981) Tetrahedron Lett. 22:1859–62; Matteucci et al (1981) J. Am. Chem. Soc. 103:3185]. The DNA samples were re-suspended at 0.5 mg/ml (314 bp PCR product) and 60 μM (25 mer) in 0.5 M sodium carbonate, pH 9.0. For each DNA, 1000–200 pl spots (total 0.2 μl) were jetted from an HP92261A thermal inkjet head in succession onto a defined position on the slide and identical samples of 0.2 μl were hand pipeted onto nearby positions on the same slide. Cy3-labeled oligonucleotide complementary to both the spotted oligos and PCR products was hybridized to the slides at a range of concentrations. Hybridization was detected by scanning for Cy3 fluorescence and quantitated using ImageQuant software. The results are provided in FIGS. 2A & 2B. Similar spotting and hybridization experiments were performed to examine DNAs fired from an HP51645 A thermal inkjet head. A 500 bp PCR product was fired from the inkjet and was found to have similar specific hybridization characteristics to hand-spotted DNA.

The results of these experiments show that the lower limit of detection and dynamic range of hybridization signal is virtually identical for the thermal inkjetted and hand-spotted oligos and PCR products indicating that the biological performance of the DNAs is not impaired by the thermal inkjetting process.

It is evident from the above results and discussion that a simple and efficient way to produce nucleic acid arrays is provided by the subject invention. By using the subject arrays, very small volumes of fluid can be deposited quickly on the substrate surface. Furthermore, the subject invention is a non-contact process such that the potential contamination and surface disruption that could arise from contact of an applicator with the substrate surface is eliminated. Finally, the thermal inkjet heads require less fluid to operate than comparable piezoelectric inkjet heads, thereby making the subject methods more economical than other methods of making arrays, particularly where expensive nucleic acid fluids are involved, e.g. cDNA compositions.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A method for depositing a pre-made nucleic acid onto a substrate surface wherein said deposited nucleic acid is capable of hybridizing to its complement, said method comprising:

loading an aqueous fluid composition of said pre-made nucleic acid into thermal inkjet head comnprising an orifice and a firing chamber by contacting said orifice with said fluid composition in a manner sufficient for said fluid composition to flow through said orifice into said firing chamber;

positioning said thermal inkjet head filled with said fluid composition of said pre-made nucleic acid in opposing relation to said substrate surface, and actuating said thermal inkjet head in a maniner sufficient to expel a volume of said composition onto said substrate surface, whereby said pre-made nucleic acid is deposited on said substrate surface, wherein
said deposited nucleic acid is capable of hybridizing to its complement.

2. The method according to claim 1, wherein said method further comprises applying back pressure to said head during said contacting step.

3. A method for depositing a pre-made nucleic acid onto a substrate surface wherein said deposited nucleic acid is capable of hybridizing to its complement, said method comprising:

(a) loading an aqueous fluid composition orsaid pre-made nucleic acid into a thermal inkjet head comprising: (i) an orifice; (ii) a firing chamber; and (iii) a heating element; by contacting said orifice with said fluid composition in a manner sufficent for said fluid composition to flow through said orifice into said firing chamber;

(b) positioning said loaded thermal inkjet head in opposing relationship to a substrate surface; and (c) raising the temperature of said heating element in a manner sufficient to expel a volume of said pre-made nucleic acid fluid through said orifice onto said substrate surface;

whereby said pre-made nucleic acid is deposited on a substrate surface, wherein said deposited nucleic acid is capable of hybridizing to its complement.

4. The method according to claim 3, wherein said nucleic acid is an oligonucleotide.

5. The method according to claim 3, wherein said nucleic acid is a polynucleotide.

6. The method according to claim 5, wherein said polynucleotide is a cDNA.

7. The method according to claim 3, wherein said method further comprises applying back pressure to said firing chamber during said contacting step.

8. The method according to claim 3, wherein said method comprises depositing nucleic acids in a plurality of discreet regions on said substrate surface.

9. A method for producing a eDNA array, said method comprising:

(a) loading an aqueous fluid pre-made cDNA composition into a Thermal inkjet head comprising: (i) an orifice; (ii) a firing chamber; and (iii) a heating clement; by contacting said orifice with said fluid composition in a manner sufficient lor said fluid composition to flow through said orifice into said firing chamber;

(b) positioning said loaded inkjet head in opposing relationship to a substrate surface;

(c) raising the temperature of said heating clement in a manner sufficient to expel a volume of DNA composition through said orifice onto said substrate surface; and (d) repeating steps (a) to (c) at least one additional time, whereby said array is produced, wherein cDNAs present on said array are capable of hybridizing to their complemnents.

10. The method according to claim 9, wherein said method further comprises applying back pressure to said firing chamber during said contacting step.

* * * * *